US009658882B1

(12) United States Patent
Fullmer et al.

(10) Patent No.: US 9,658,882 B1
(45) Date of Patent: May 23, 2017

(54) PROVIDING RELEVANT INFORMATION BASED ON USAGE DATA

(71) Applicant: Amazon Technologies, Inc., Reno, NV (US)

(72) Inventors: Gy Stuart Fullmer, Santa Cruz, CA (US); Arnaud Marie Froment, San Jose, CA (US); Srinivasan Sridharan, Sunnyvale, CA (US); Levon Dolbakian, Los Gatos, CA (US); Andrea Robin Kilpatrick, San Jose, CA (US); Michael David Dumont, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 428 days.

(21) Appl. No.: 13/932,774

(22) Filed: Jul. 1, 2013

(51) Int. Cl.
| | | |
|---|---|---|
| *G06N 3/08* | (2006.01) | |
| *H04N 21/25* | (2011.01) | |
| *H04N 21/45* | (2011.01) | |
| *G06F 9/48* | (2006.01) | |
| *G06Q 30/06* | (2012.01) | |
| *G06Q 10/10* | (2012.01) | |
| *G06Q 30/02* | (2012.01) | |
| *H04N 21/466* | (2011.01) | |

(52) U.S. Cl.
CPC ............ *G06F 9/4881* (2013.01); *G06N 3/08* (2013.01); *G06Q 30/0631* (2013.01); *H04N 21/25* (2013.01); *H04N 21/45* (2013.01); *G06Q 10/10* (2013.01); *G06Q 30/02* (2013.01); *H04N 21/4668* (2013.01)

(58) Field of Classification Search
None
See application file for complete search history.

(56) References Cited

PUBLICATIONS

Dixit et al., Automatic Recommendation for Online Users Using Web Usage Mining, International Journal of Managing Information Technology (IJMIT) vol. 2, No. 3, [online], Aug. 2010 [retrieved on Jun. 17, 2015]. Retrieved from the nternet:<URL:http://www.google.com/url?sa=t&rct=j&q=&esrc=s&source=web&cd=1&cad=rja&uact=8&ved=0CB8QFjAA&url=http%3A%2F%>.*
Niu02, Understanding Web Usage for Dynamic Web-Site Adaptation: A Case Study [online], 2002 [retrieved on Dec. 31, 2015]. Retrieved from the Internet<URL: http://www.google.com/url?sa=t& rct=j&q=&esrc=s&source=web&cd=4&cad=rja& uact=8& ved=0ahUKEwjAuPqHsoXKAhUCRiYKHTwNBr8QFggoMAM&url=http%3A%2F%2Fweb.cse.msstate.edu%2F~niu%2Fpapers%2FWSE02.pdf>.*

* cited by examiner

*Primary Examiner* — Stanley K Hill
*Assistant Examiner* — Nathan Brown, Jr.
(74) *Attorney, Agent, or Firm* — Seyfarth Shaw LLP; Ilan N. Barzilay; Christopher A. Baxter

(57) ABSTRACT

A computing device can obtain usage data associated with the device. The usage data indicate how the computing device operates or how the device is used. The device can analyze the usage data to recognize usage patterns. The usage patterns can correspond to recurring actions or tasks initiated by the user using the device, such as actions or tasks initiated due to the user's habits and/or routines. Based on the usage patterns, the device can determine a task that has a sufficient likelihood of being performed using the device within a specified or determined time (e.g., 5 minutes from now, one year from now, etc.). The device can provide information (e.g., recommendations) associated with the task, and likely relevant to the user. The user can use the provided information to perform the task, thereby increasing the ease of access or efficiency associated with performing the task.

20 Claims, 10 Drawing Sheets

PROVIDING RELEVANT INFORMATION BASED ON USAGE DATA

BACKGROUND

Computing devices are becoming more commonplace and are used for a wide variety of purposes. Every day, people use their computing devices to view, access, and/or interact with various types of content and information, especially as computing devices and applications are growing in number and in function. A computing device can be used by a user to communicate, capture images, check email, browse the Internet, and transmit or receive various types of information. The user of a computing device may use his computing device wherever he goes, throughout his day. In some cases, the user may develop one or more routines (e.g., daily routines, weekly routines) in regards to how he lives his life. In one example, almost every weekday morning, the user communicates with his spouse on his way to work. Conventional approaches for accomplishing this task can typically involve the user taking out his computing device, finding his spouse's contact information, and calling his spouse using the device. In another example, nearly every Friday night, the user invites a friend(s) over to hang out, eat, and watch a movie. A conventional approach can involve the user pulling out his device, opening a web browser or other relevant application, and searching for movie reviews and suggestions. In some instances, the amount of steps or user actions needed to perform these takes can be inconvenient, time-consuming, or cumbersome to the user. These and other concerns can reduce the overall user experience associated with using computing devices to help perform various tasks in the user's life.

BRIEF DESCRIPTION OF THE DRAWINGS

Various embodiments in accordance with the present disclosure will be described with reference to the drawings, in which.

DETAILED DESCRIPTION

Figure 1:
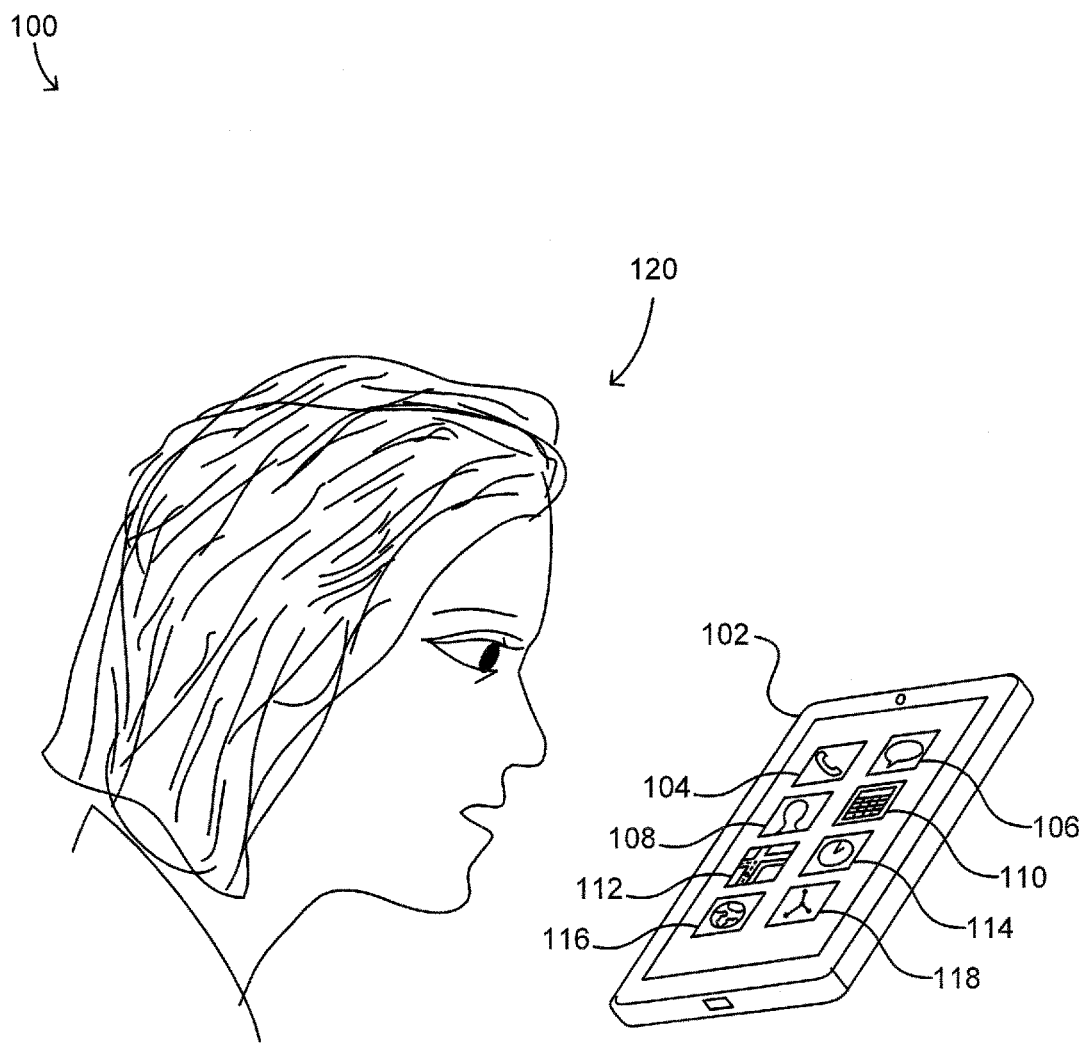
FIG. 1 illustrates an example environment in which aspects of the various embodiments can be utilized.

Systems and methods in accordance with various embodiments of the present disclosure overcome one or more of the above-referenced and other deficiencies in conventional approaches to performing computing tasks. In particular, various embodiments of the present disclosure can provide a recommendation or other relevant information useful for performing a specified task, as may be associated with a user.

At least some embodiments enable a computing device to receive, obtain, and/or access usage data associated with the device. In some instances, usage data can correspond to information indicative of how the computing device operates or how the device is used. The computing device can analyze the usage data associated with the device and determine (i.e., identify, recognize, etc.) one or more usage patterns. The usage patterns can correspond to recurring actions or tasks performed by the computing device (e.g., initiated by a user of the device). In some cases, usage patterns can include reoccurrences of particular activities performed using the computing device. In some cases, usage patterns can be associated with user habits and/or routines. Based on the usage patterns, the device can determine (e.g., identify, recognize, predict, etc.) a task that potentially may be performed by the device (e.g., initiated by the user) at a future time. In other words, the device can identify a task that has a sufficient likelihood of being performed using the device within a specified or determined time period (e.g., near-future, 5 minutes from now, one day from now, one year from now, etc.). As such, the device can provide information (e.g., one or more recommendations) that is associated with the task, and likely relevant to the user. The information can be provided to the user within the specified time period. Accordingly, various embodiments of the present technology can enable the user to utilize the provided information when performing a task, which can thereby improve the efficiency, usability, and/or accessibility, etc., associated with performing the task.

In one example, usage data can include how the device is used to communicate. In this example, a usage pattern can correspond to the user using the device to call his spouse at a particular time during weekdays (e.g., the user typically calls his spouse every weekday morning at 9:00 AM). The computing device can analyze the usage data to recognize this usage pattern (e.g., the user's recurring action of calling his spouse at the particular time on weekdays). Accordingly, the next weekday morning at or prior to 9:00 AM, the device can provide access to information that is likely relevant to the user, such as his spouse's contact information. As such, in this example, the user does not have to manually search for or navigate to his spouse's contact information in order to initiate a communication with his spouse. Further, in some embodiments, at or prior to 9:00 AM, the device can open or initiate a communication application (e.g., phone app, messaging app) and configure the application to be ready to contact the spouse (e.g., input the spouse's contact information into the recipient field of the communication). Therefore, the device can attempt to predict what actions the user might next take and provide information relevant to the user's potential next actions, thereby reducing the time and effort required by the user to perform the actions.

Other variations, functions, and advantages are described and suggested below as may be provided in accordance with the various embodiments.

FIG. 1 illustrates an example environment 100 in which aspects of the various embodiments can be utilized. The example environment 100 can comprise a computing device 102. The computing device 102 can include various applications (i.e., apps), such as a phone application 104, an electronic messaging application 106, an application for contact information 108, a calendar application 110, a map or navigation application 112, a clock application 114, a web browsing application 116, a social networking application 118, etc. A person having ordinary skill in the art would recognize various other applications in addition to or alternative to the applications shown as examples in FIG. 1.

In some instances, a user 120 of the computing device 102 can utilize the device 102 for a wide variety of purposes. For example, the user 120 can call a friend using the phone app 104, can send an electronic message (e.g., text message, media message, email message, etc.) to an acquaintance via the messaging app 106, can record and access contact information using the contacts app 108, and so forth.

Various embodiments of the present disclosure can enable the computing device 102 to learn from how the device 102 is used. In some embodiments, the device 102 can observe and analyze usage data associated with the device 102, in order to learn to recognize patterns in how the device 102 is used (e.g., how the device 102 operates). The usage data can include current usage data and/or previous (i.e., historical) usage data. In some cases, the user 120 can develop one or more habits or routines in life, such as an hourly routine, a daily routine, a weekly routine, a monthly routine, an annual routine, etc. In one example, the user 120 checks his email using the device 102 at approximately 8:07 AM almost every weekday, for the past three years. In another example, nearly every weekday morning for the past month at approximately 8:22 AM, the user 120 gets into his car and opens the map/navigation 112 to help him determine what the quickest route to work is. Based on the user's habits and/or routines and/or other usage data associated with the computing device 102, the device 102 can learn to recognize patterns and/or recurring events related to how it is used or operated (i.e., usage patterns).

In some embodiments, having recognized or determined usage patterns associated with how the device 102 is used and/or how it operates, the device 102 can attempt to determine (i.e., identify, predict, etc.) a task(s) that can potentially be performed using the computing device 102 at a specified time. In some cases, the device 102 can calculate a likelihood of (e.g., a confidence score indicating) whether or not the task(s) will be performed using the device 102 within a specified time period (e.g., within the next 5 minutes, within the next day, within the next decade, etc.). The potential task(s) that is determined can be a task that has a likelihood, above a specified threshold, of being performed at the device 102 within the specified time period (e.g., in the near-future).

Referring to the previous examples, the device 102 can determine, with sufficient, minimum, or satisfactory confidence, that the user 120 will probably check email today (e.g., a weekday) at approximately 8:07 AM. Further, the device 102 can determine that the user 120 will likely open the map/navigation 112 at approximately 8:22 AM to figure out the quickest way to get to his work. Based on determining (i.e., identifying, predicting, etc.) which tasks are likely to be performed at the device 102 at or near the specified time, the device 102 can provide recommendations and/or other relevant information associated with those tasks that are likely to be performed (e.g., initiated by the user 120) at or near the specified time.

Continuing with the previous examples, at 8:00 AM, the device 102 can make the icon for the email application easier to access for the user 120. Additionally or alternatively, the device 102 can initiate the email application and provide (e.g., display) at least a portion of an interface for the email application. Moreover, the device 102 can begin to check for and/or download new emails. As such, the user 120 can more easily access his emails and can finish his email checking task more quickly and efficiently. Then at 8:15 AM, for example, the device 102 can recommend the user 120 to take Highway 101 North to get to work, rather than Highway 909 North. In some embodiments, the providing of the recommendations and/or other information can be performed dynamically and/or in real-time, such that a change in the situation can be handled quickly.

Figure 2:
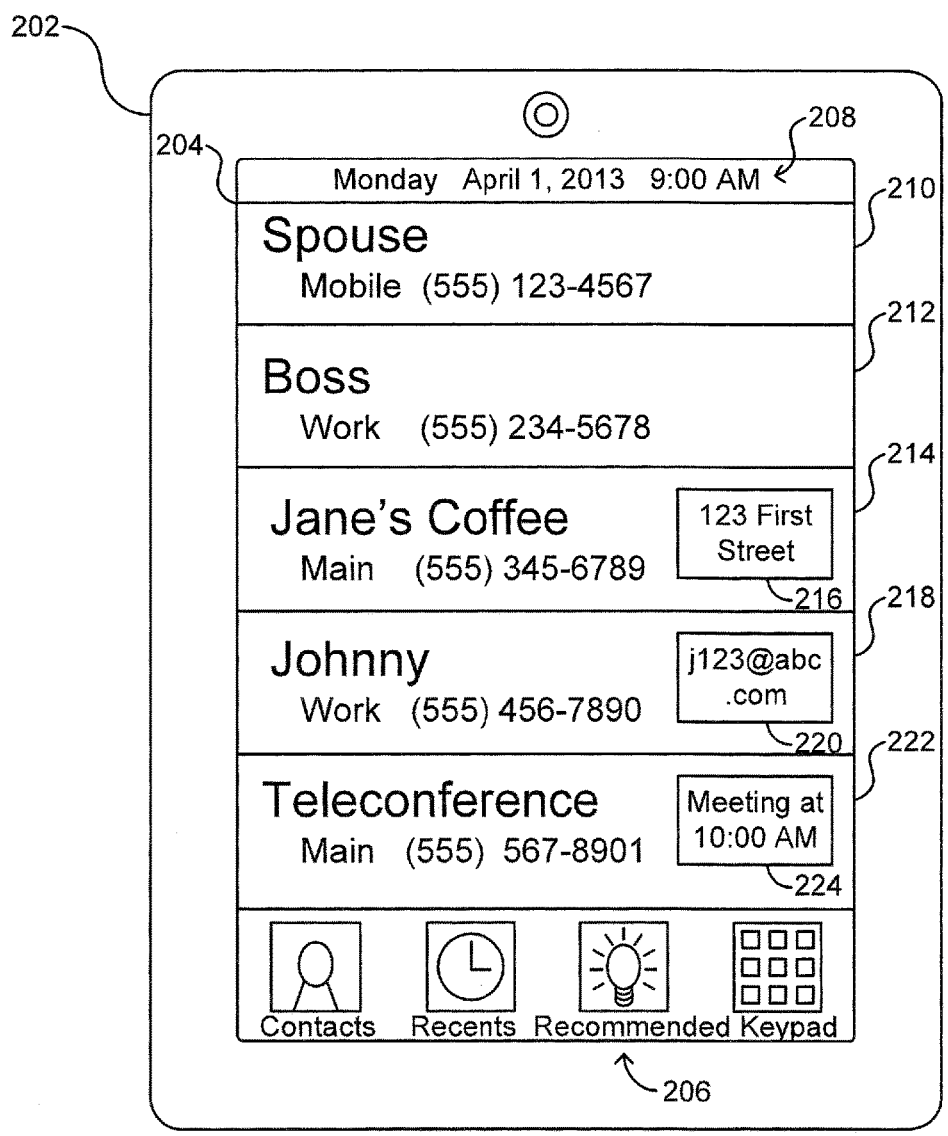
FIG. 2 illustrates an example device embodiment at which relevant information can be provided based on usage data.

FIG. 2 illustrates an example device embodiment 202 at which relevant information can be provided based on usage data. In FIG. 2, there can be a computing device 202. There can also be a phone application or function 204 included (e.g., installed) on the device 202. The phone application 204 can have conventional features such as a contact list, a recent call log (e.g., dialed calls, missed calls, etc.), and a keypad for manually dialing numbers. Moreover, the present disclosure can enable the device 202 to provide a recommended contacts feature 206, which can provide information about one or more contacts that are likely to be relevant to the user at a time of interest (e.g., at a specified time, within a specified or determined time period, in the near-future, etc.).

In at least some embodiments, the computing device 202 can track, record, observe, and/or otherwise obtain usage data associated with the device 202. In the example of FIG. 2, the device 202 can recognize a weekday morning routine for a user of the device. For example, on most weekdays in the past two years, the user tends to call his spouse at approximately 9:00 AM, while driving to work. In the past two months, at approximately 9:10 AM, the user tends to call his boss to report in. At approximately 9:20 AM, for the past three weeks, the user has been calling Jane's Coffee shop to order and pick up coffee. When the user arrives at work, for the past week, he tends to send a text message to his co-worker, Johnny. Then, for the last three days, the user has been dialing in to a conference bridge number to attend a teleconference meeting at 10:00 AM. These actions initiated and/or performed by the user using the device 202 can be observed or otherwise tracked as usage data of the device 202.

Continuing with the example of FIG. 2, based on the obtained usage data, the device 202 can identify a usage pattern which indicates that the user is likely to call his spouse today (e.g., Monday Apr. 1, 2013) at approximate 9:00 AM (e.g., 208). As such, the device 202 can provide contact information for the user's spouse 210 at the top of a recommended contacts list, at or prior to 9:00 AM, as shown in FIG. 2. Similarly, the device 202 can identify another usage pattern indicating that the user will probably call his boss at approximately 9:10 AM. Thus, the device 202 can provide the boss's contact information 212 next in the recommended contacts list. Further, the device 202 can recognize another usage pattern indicating that the user will probably call Jane's Coffee at approximately 9:20 AM, so the device 202 can provide contact information for Jane's Coffee 214. Also, in some embodiments, the device 202 can retrieve information from the web (e.g., a local business and restaurant guide website), and provide the retrieved information to the user. As shown in FIG. 2, the address 216 for Jane's Coffee can be provided 220. In a similar fashion, since the user tends to text message Johnny, the device 202 can provide Johnny's phone number 218 and email address 220 (e.g., retrieved from the device's contacts feature or app) in case the user wants to call Johnny. Moreover, based on the obtained usage data (e.g., including data from a calendar/events feature or app of the device), the device 202 can recognize that the user will likely attend a teleconference at 10:00 AM and thus provide the relevant conference bridge telephone number 222. Information at the calendar/events feature or app relating to the meeting 224 can also be provided.

Accordingly, the user can utilize the recommended contacts feature 206 to find or navigate to likely relevant contact data. This can reduce the need for the user to manually search through his call logs and/or through all of his contacts in order to find the relevant information. Also, in at least some embodiments, the recommended contacts feature 206 can be dynamic, such that the recommended contact list can change throughout the day and/or due to changes in the user's situation. For example, after 9:05 AM and/or after the device 202 has determine that the user has already called his spouse, the contact information for the user's spouse 210 can be removed from the recommended contacts list, and the rest of the contact information can be moved up the list and new contact data can be added as well. In another example, if the calendar feature/app shows that the teleconference was cancelled, the information for the teleconference (222 and 224) can be removed as well.

Figure 3:
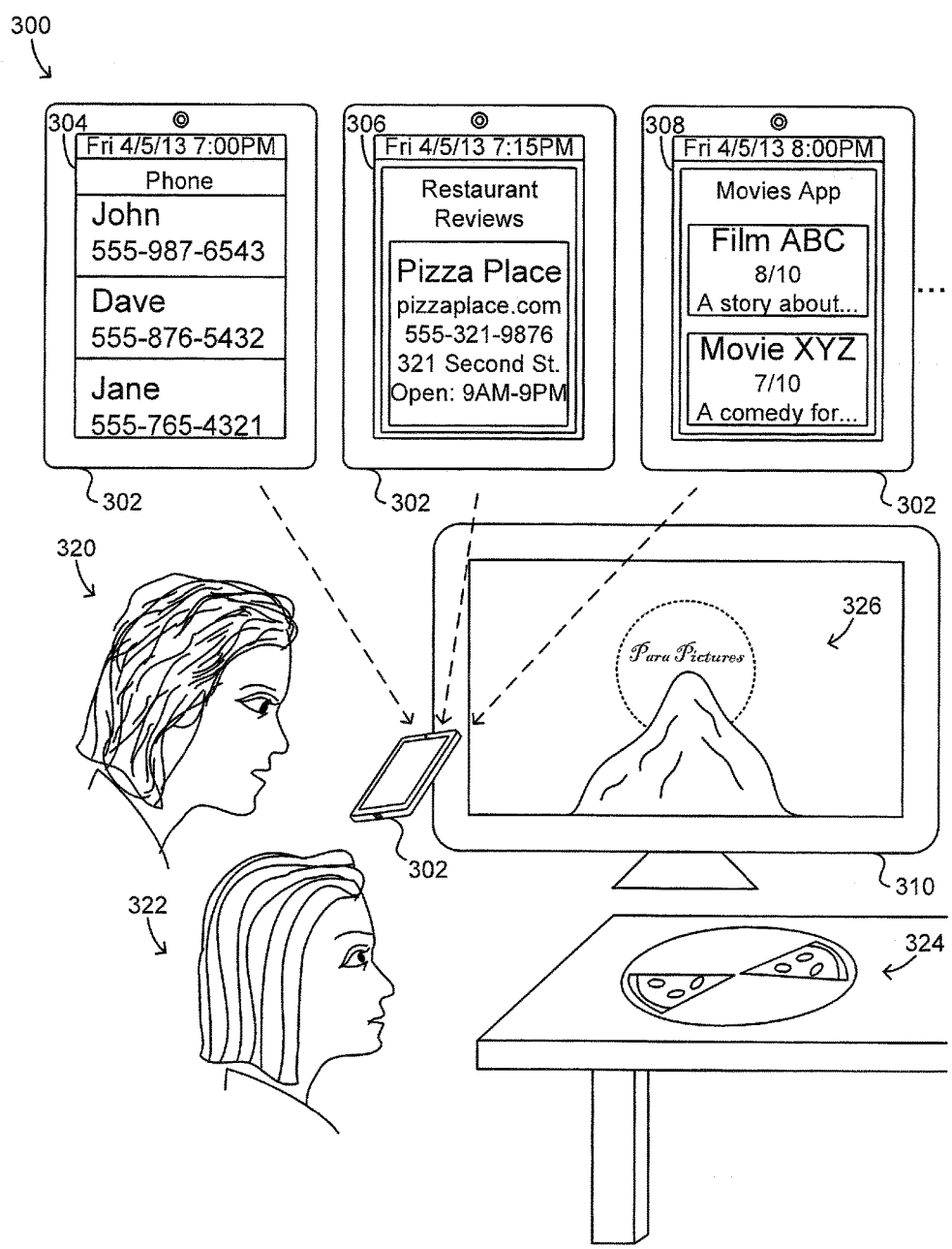
FIG. 3 illustrates an example scenario which can utilize relevant information provided based on usage data.

With reference now to FIG. 3, FIG. 3 illustrates an example scenario 300 which can utilize relevant information provided based on usage data. Regarding the example scenario 300, a user 320 of a computing device 302 can host a weekly "movie night" in which she invites friends over to her place to hang out, eat, and watch a movie. Accordingly, as shown in FIG. 3, the example scenario 300 can involve, among other things, the user 320, one or more friends 322 of the user, food 324 (e.g., delivered pizza, take-out food, etc.), a device 310 for watching the movie (e.g., a television), movie content 326, etc.

In the example of FIG. 3, the user 320 can have hosted the movie night on nearly every Friday night for the past year. In this example, the device 302 can obtain device usage data including (but not limited to) how the device 302 is used to make communications (e.g., phone calls, text messages, emails, etc.) among the user 320 and her friends, how the device 302 is used to order food, and how accessing a web service to obtain movie-related information is performed using the device 302. Based on the usage data, the device 302 can identify usage patterns. In this example, the device 302 can recognize that, on a typical Friday night, the user 320 calls John, Dave, and Jane at approximately 7:00 PM, orders food from "Pizza Place" at approximately 7:30 PM, and accesses web information about movies at approximately 8:00 PM.

In some embodiments, based on the identified/recognized usage patterns, the device 302 can determine (i.e., predict, etc.) one or more tasks that have a sufficient, minimum, or satisfactory likelihood of being performed at the device 302 (e.g., initiated by the user 320). Thus, the device 302 can provide access to relevant information (including suggestions or recommendations) at or prior to a time when the information may be useful.

Continuing with the example of FIG. 3, the device 302 can provide access to the device's phone application and/or to contact information 304 for John, Dave, and Jane, at or prior to 7:00 PM (when the user 320 typically contacts John, Dave, and Jane). Likewise, at or prior to 7:30 PM, the device 302 can retrieve and provide access to information 306 about a restaurant that the user 320 typically orders from. In addition, at or prior to 8:00 PM, the device 302 can retrieve and provide access to movie information 308 from a website that the user 320 frequents. This and other relevant information provided can improve the efficiency and/or ease of access associated with performing the user's tasks.

Again, as discussed above, the relevant information provided to the user can change dynamically and/or in real-time. For example, if the device 302 detects (e.g., using information retrieved from a web resource, such as a local restaurant review website) that Pizza Place is closed for some reason, then the device 302 can provide access to other similar restaurants and/or other restaurants that the user 320 had previously ordered from. In another example, if an electronic message is received from Jane at 6:40 PM indicating that she cannot attend the movie night, then Jane's contact information need not be provided. In a further example, if the device 302 determines that the user 320 tends to post a status update on a social networking application an hour into the movie, then the device 302 can initiate or otherwise provide easier access to the social networking application at or prior to that time. In another example, if the device 302 determines, based on device geolocation (e.g., GPS) data, that it is not at or near the user's home address on a Friday night, then the device 302 can decide not to provide information 304, 306, and 308. The device 302 can, for example, determine other relevant information to provide instead.

Moreover, various embodiments can enable communications among multiple devices. Referring to the example of FIG. 3, in some embodiments, device 302 and device 310 can communicate with one another. In the example scenario 300, perhaps throughout the day, the user 320 had been using device 302 to browse the web and she spent a lot of time viewing information about "Movie XYZ." Additionally or alternatively, the user 320 could have used device 302 to communicate electronically with her friends throughout the day and they could have agreed to watch Movie XYZ. These and other pieces of usage data can be observed, obtained, and analyzed by device 302. Device 302 can determine that data related to Movie XYZ is likely relevant for tonight. In some cases, device 320 can perform one or more actions using the relevant information (e.g., the data related to Movie XYZ). For example, device 320 can communicate to device 310 and cause device 310 to begin loading the contents of Movie XYZ prior to when the user 320 typically watches movies (e.g., preload at least a portion of Movie XYZ prior to 8:00 PM). This can reduce lag and/or buffering time associated with playback of the movie (and/or other media content). Also, the preloading can increase a quality (e.g., image quality, resolution, bit rate, audio quality, etc.) associated with playback of the movie. Furthermore, in some embodiments, the movie (and/or other media content) can be preloaded on device 320.

In some embodiments, whether the user 320 actually accessed and/or used the provided relevant information can be taken into consideration. For example, if the user 320 no longer used the provided contact information for Jane for the last three movie nights, the device 302 can learn from this pattern and can utilize it as input or feedback, such that perhaps next time, the device 302 need not provide Jane's contact information.

Figure 4A:
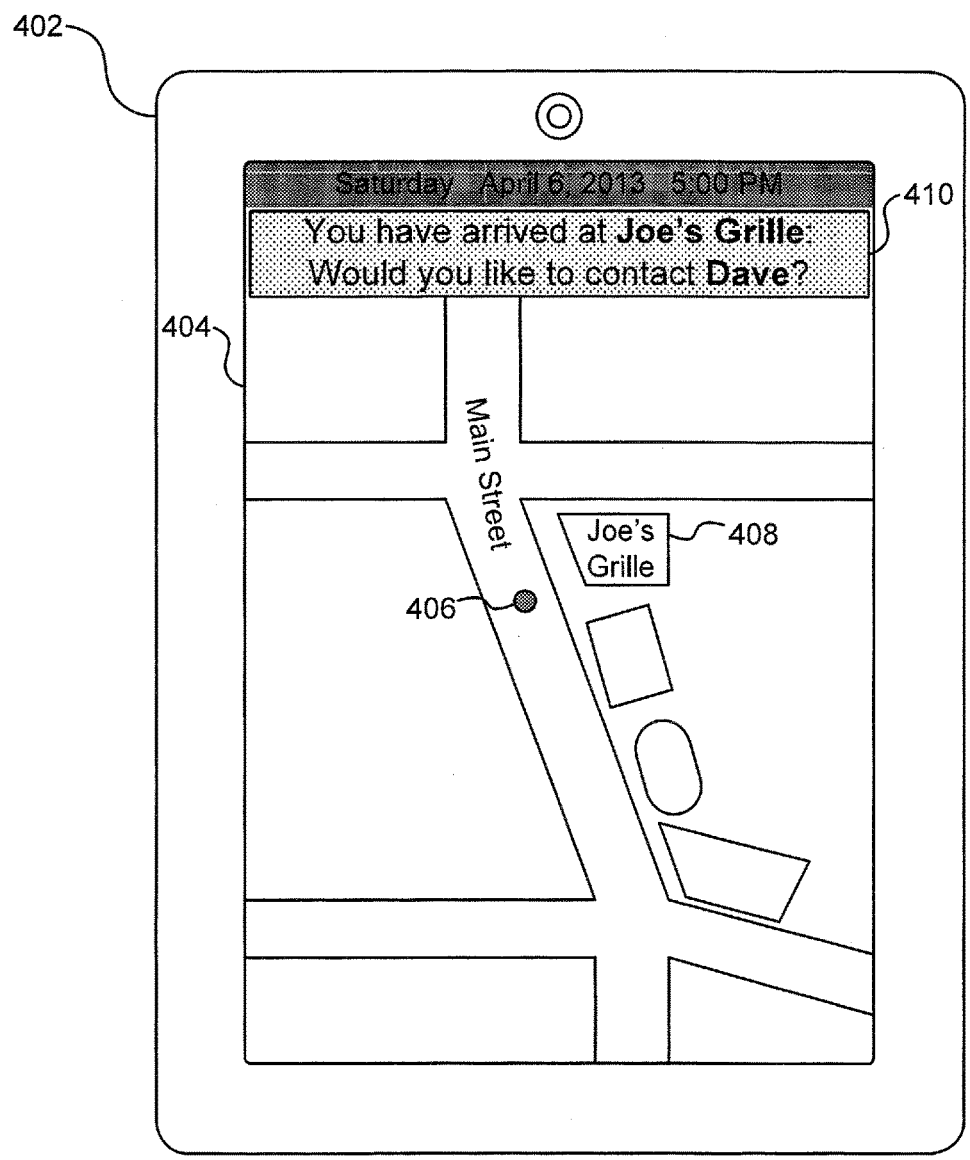
FIG. 4A illustrates an example device embodiment at which relevant information can be provided based on usage data.

Turning now to FIG. 4A, FIG. 4A illustrates an example device embodiment 402 at which relevant information can be provided based on usage data. The example computing device embodiment 402 of FIG. 4A can utilize one or more geolocation sensors on the device 402 to obtain geolocation information associated with the device 402. Although not shown in FIG. 4A, the device 402 can include one or more geolocation sensors, such as a GPS sensor, a sensor for radio signal multilateration, etc.

In the example of FIG. 4A, the user of computing device 402 frequently meets with his best friend Dave at Joe's Grille on Saturday evenings. The user can be utilizing a map application (i.e., app) 404 to get to Joe's Grille. As shown in FIG. 4A, the map app 404 can indicate that the user's current representative geolocation 406 has arrived at the desired destination (e.g., Joe's Grille 408). The device 402 can recognize that the user frequently meets Dave at Joe's Grille on Saturday evenings (at or near 5:00 PM). As such, at or prior to Saturday 5:00 PM and/or upon recognizing that the user (e.g., the user's device 402) is at or near Joe's Grille, the device 402 can provide relevant information to the user via a notification 410. The notification 410 can ask the user whether he would like to contact Dave. The user can interact with (e.g., click on, tap on, etc.) the notification 410 to cause a communication application 412 (e.g., messaging application) to be provided to the user, as shown in FIG. 4B.

Figure 4B:
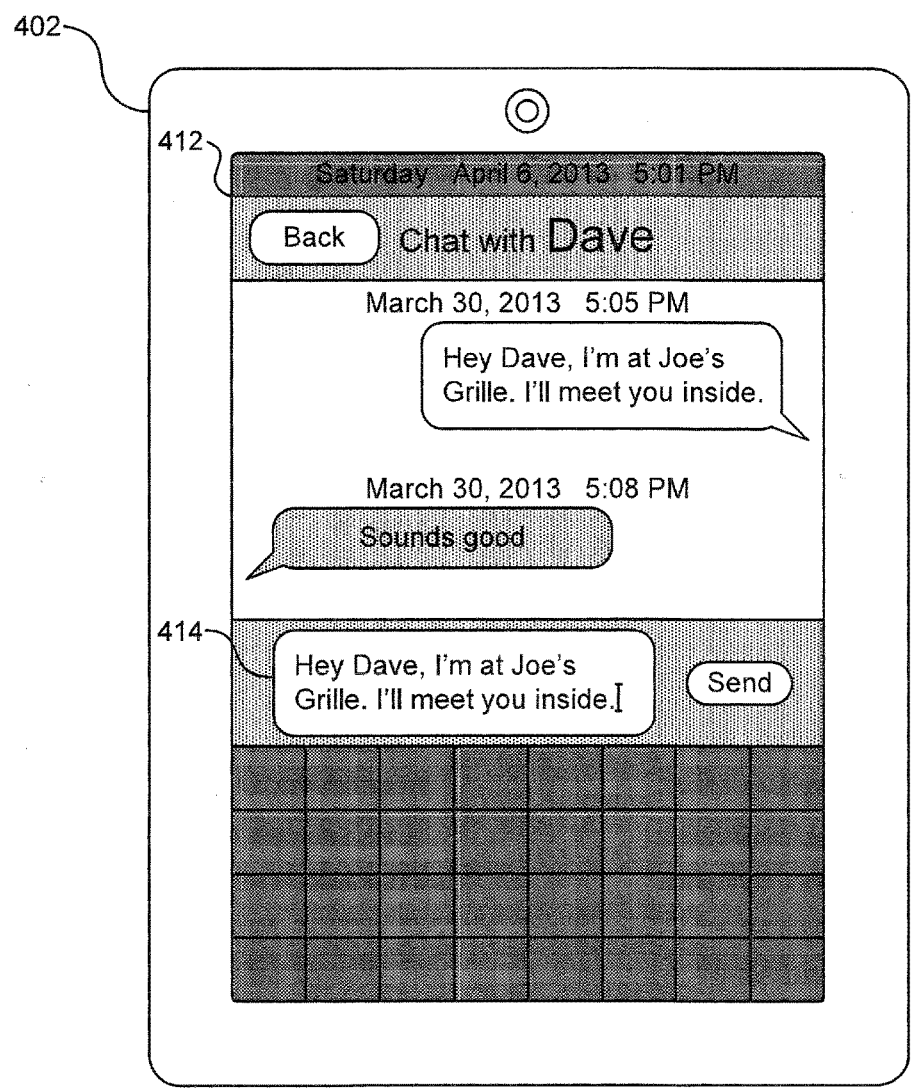
FIG. 4B illustrates the example device embodiment of FIG. 4A at which relevant information can be provided based on usage data.

FIG. 4B illustrates the example device embodiment 402 of FIG. 4A at which relevant information can be provided based on usage data. In some embodiments, the device 402 can analyze usage data including communication data (e.g., data associated with phone calls, data associated with call logs, data associated electronic messages such as text message or emails, etc.). In the scenario of example of FIG. 4B, most of the time when the user arrives at Joe's Grille to meet Dave, the user will send a text message to Dave stating "Hey Dave, I'm at Joe's Grille. I'll meet you inside." The device 402 can recognize that the user frequently and recurrently sends this (or another similar) message when he arrives. Thus, when the communication application 412 is provided to the user, the device 402 can generate (e.g., preload) message content 414 that reads "Hey Dave, I'm at Joe's Grille. I'll meet you inside." This can further reduce the time and effort required by the user if he was to type the message manually.

Moreover, in some embodiments, if the device 402 detects that the time is Saturday 5:15 PM, that the user has not yet arrived at Joe's Grille, and that the user is not on the way, then a notification can be provided to the user, asking him whether he would like to contact Dave. If the user chooses to contact Dave, then the message content can be generated by the device 402 to state, for example, that the user cannot make it, or something similar. Alternatively, if the device 402 detects that the user is still on the way, then the message content can be generated to say that the user is running late but still on the way, or something similar.

In addition, in some cases, the device 402 of the user can communicate with a computing device associated with Dave. If at least one of the devices determine that its respective geolocation is substantially close in proximity to that of the other (but not close to Joe's Grille), then the device can recommend another restaurant that is nearby.

Figure 5:
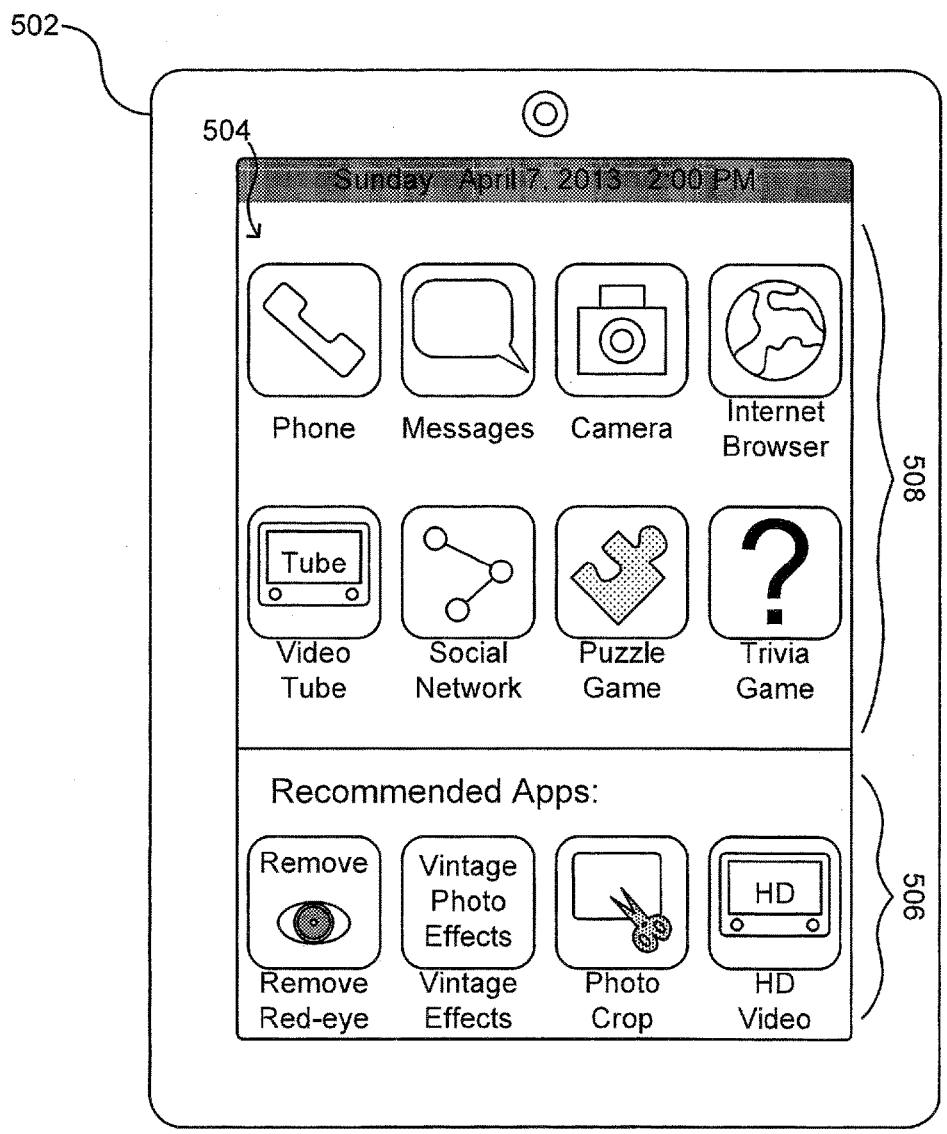
FIG. 5 illustrates an example device embodiment at which relevant information can be provided based on usage data.

FIG. 5 illustrates an example device embodiment 502 at which relevant information can be provided based on usage data. In some embodiments, the provided relevant information (including recommendations) can correspond to one or more applications. As shown in the example of FIG. 5, in some instances, the computing device embodiment 502 can determine, based on usage data, that the user is likely to open, initiate, run, or otherwise interact with a particular application(s) at or within a specified time(s).

In one example, the device 502 can recognize that on most Sunday afternoons (e.g., at approximately 2:00 PM), the user likes to access, use, play with, or otherwise interact with certain applications on the device 502 (e.g., Remove Red-eye app, Vintage Effects app, Photo Crop app, HD Video app). As such, at least a portion 506 of a device home screen page, desktop, or other interface (e.g., operating system interface 504) can be used to provide access to one or more of these applications that are likely to be relevant to the user at or within the specified time (e.g., access to one or more recommended applications can be provided at or prior to 2:00 PM on Sunday). The remaining portion 508 can be used to provide access to default applications, applications that the user choose to place in the remaining portion 508, etc. Moreover, in some cases, an entire home screen page or other interface can be used to provide access to (e.g., used to display icons representing) the one or more relevant applications (e.g., recommended applications). Also, similar to previous discussions, the apps that are recommended and provided can change dynamically.

Figure 6A:
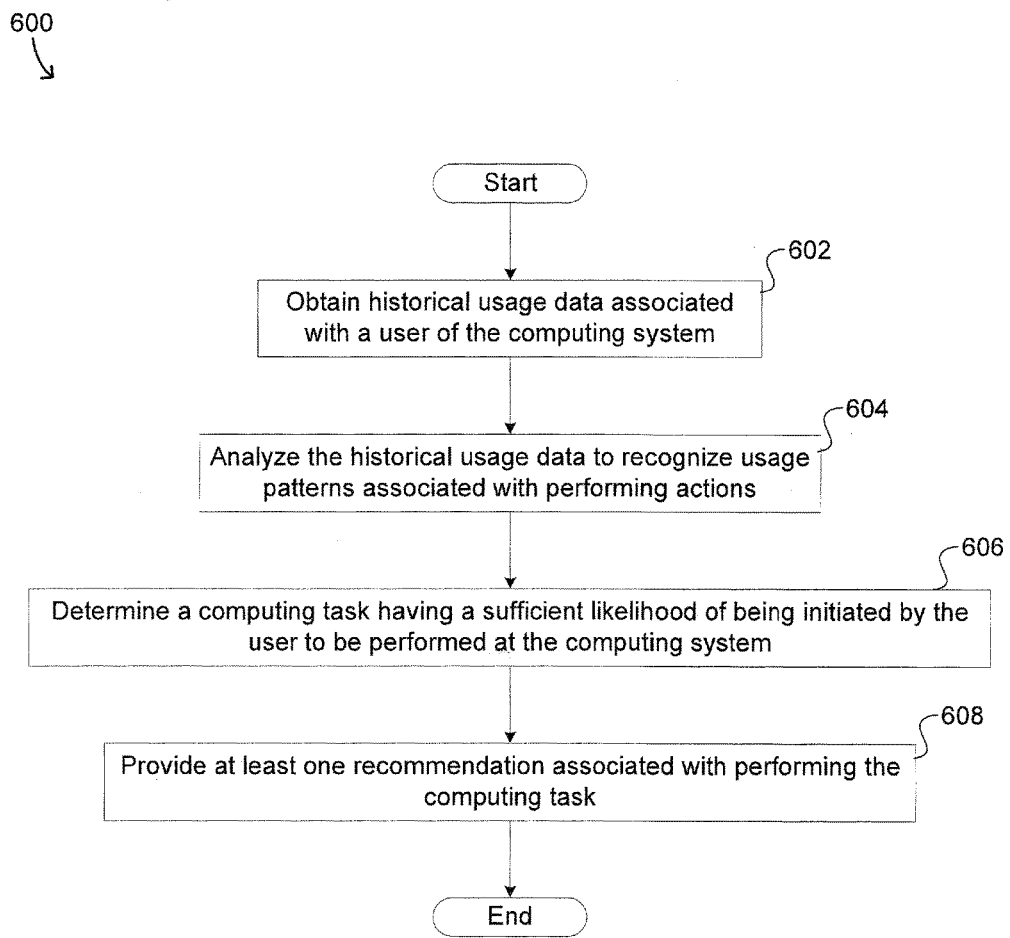
FIG. 6A illustrates an example method embodiment for providing relevant information based on usage data.

FIG. 6A illustrates an example method embodiment 600 for providing relevant information based at least in part on usage data. It should be understood that there can be additional, fewer, or alternative steps performed in similar or alternative orders, or in parallel, within the scope of the various embodiments unless otherwise stated. At step 602, the example method embodiment 600 can obtain historical usage data associated with a user of the computing system. At step 604, the example method 600 can analyze the historical usage data. Based, at least in part, on the analysis of the historical usage data, the method 600 can recognize one or more usage patterns associated with performing actions on the computing system. The actions can be initiated by the user.

Step 606 can include determining a computing task having a sufficient likelihood of being initiated by the user to be performed at the computing system. In some cases, the computing task can be determined to have a sufficient likelihood of being initiated by the user to be performed at the computing system within a specified or determined time period. In some cases, the computing task can be determined based, at least in part, on the one or more usage patterns. Then the method 600 can provide at least one recommendation associated with performing the computing task, at step 608. In some instances, the at least one recommendation can be provided within the specified time period. The at least one recommendation can be useful for improving efficiency associated with performing the computing task. For example, the at least one recommendation can decrease an amount of user interactions required to perform the computing task. In other words, due to the at least one recommendation, less effort on the part of the user is need to perform the computing task.

Figure 6B:
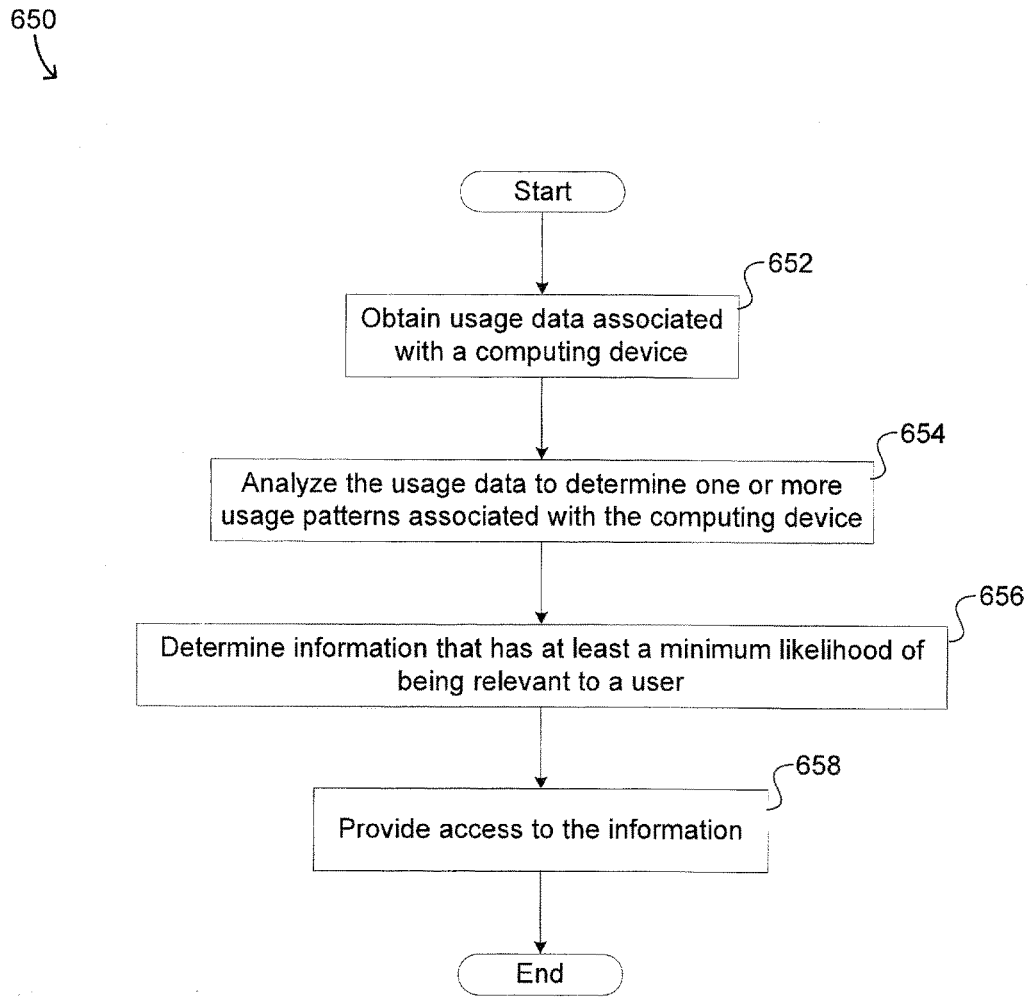
FIG. 6B illustrates an example method embodiment for providing relevant information based on usage data.

FIG. 6B illustrates an example method embodiment 650 for providing relevant information based on usage data. Again, it should be understood that there can be additional, fewer, or alternative steps performed in similar or alternative orders, or in parallel, within the scope of the various embodiments unless otherwise stated. The example method embodiment 650 can obtain usage data associated with a computing device, at step 652. Then at step 654, the example method 650 can analyze the usage data to determine one or more usage patterns associated with the computing device.

Step 656 can include determining information that has at least a minimum likelihood of being relevant to a user of the computing device. In some instances, the information can be determined to be likely relevant to the user within a specified or determined period of time. In some cases, the information can be determined based, at least in part, on the one or more usage patterns. Then step 658 can include providing access to the information that has the at least the minimum likelihood of being relevant to the user. In some embodiments, the access to the information can be provided within the specified period of time. In some instances, the information can be useful for improving an efficiency associated with performing a task of the user. The task can be performed using, at least in part, the computing device. In some cases, the task can be performed within the specified period of time.

In some embodiments, the obtaining usage data can include accessing information indicative of how the user uses the computing device. For example, the information can include (but is not limited to) at least one of communication data, calendar data, clock data, geolocation data, orientation data, image data, audio data, web browsing data, network data, or application data.

In some embodiments, access to the relevant information can be provided via at least one of a page interface (e.g., home screen page interface), a desktop interface, an operating system interface, a notification, a reminder, a calendar event, or an application interface, etc.

Various embodiments can also enable third party application developers to utilize the present technology. For example, application programming interfaces (APIs) for the present technology can be implemented such that third party applications can utilize one or more features of the present technology. In some cases, the user of the device can choose whether or not to allow an app (e.g., third party app) to have access to the present technology.

It is further contemplated that there can be many other uses and/or applications associated with the various embodiments of the present disclosure that a person having ordinary skill in the art would recognize.

Figure 7:
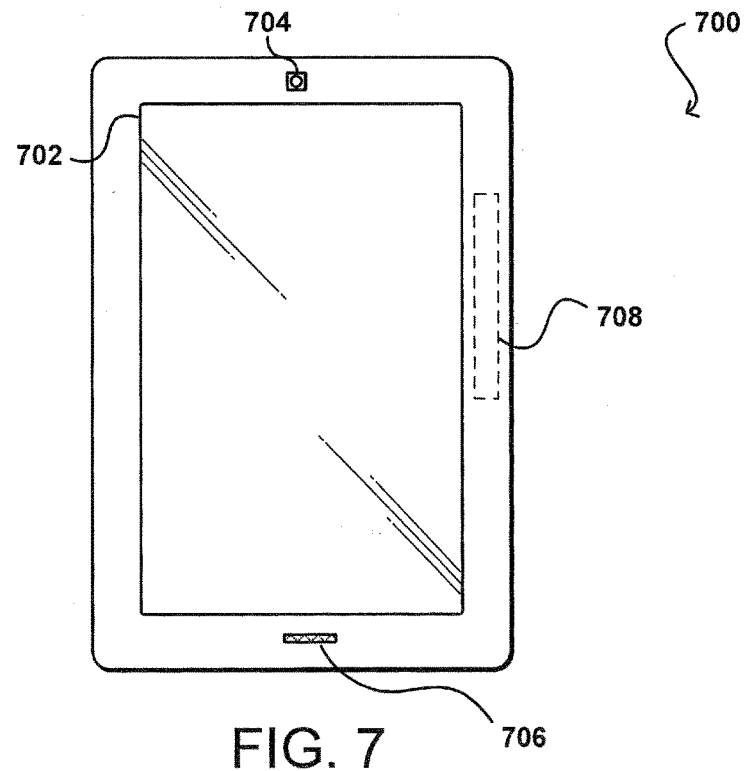
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
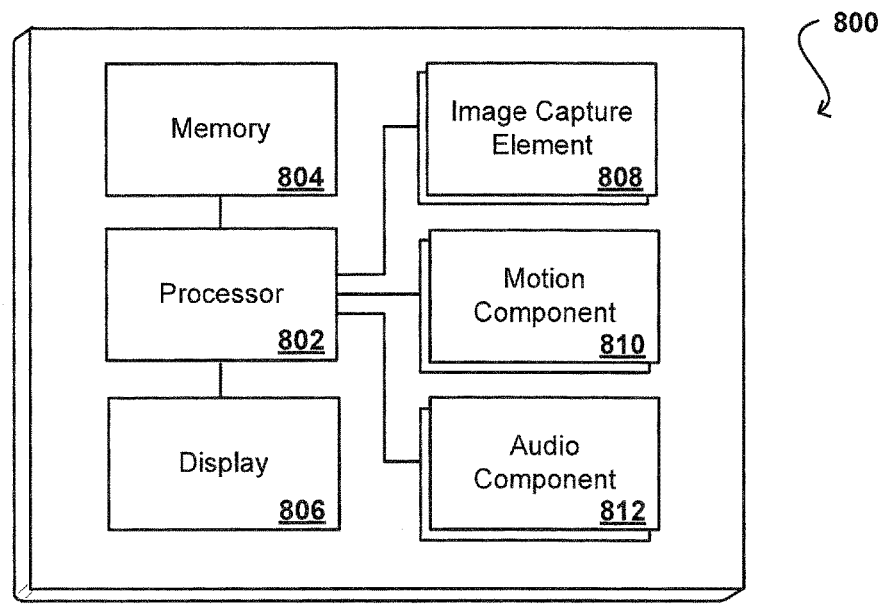
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
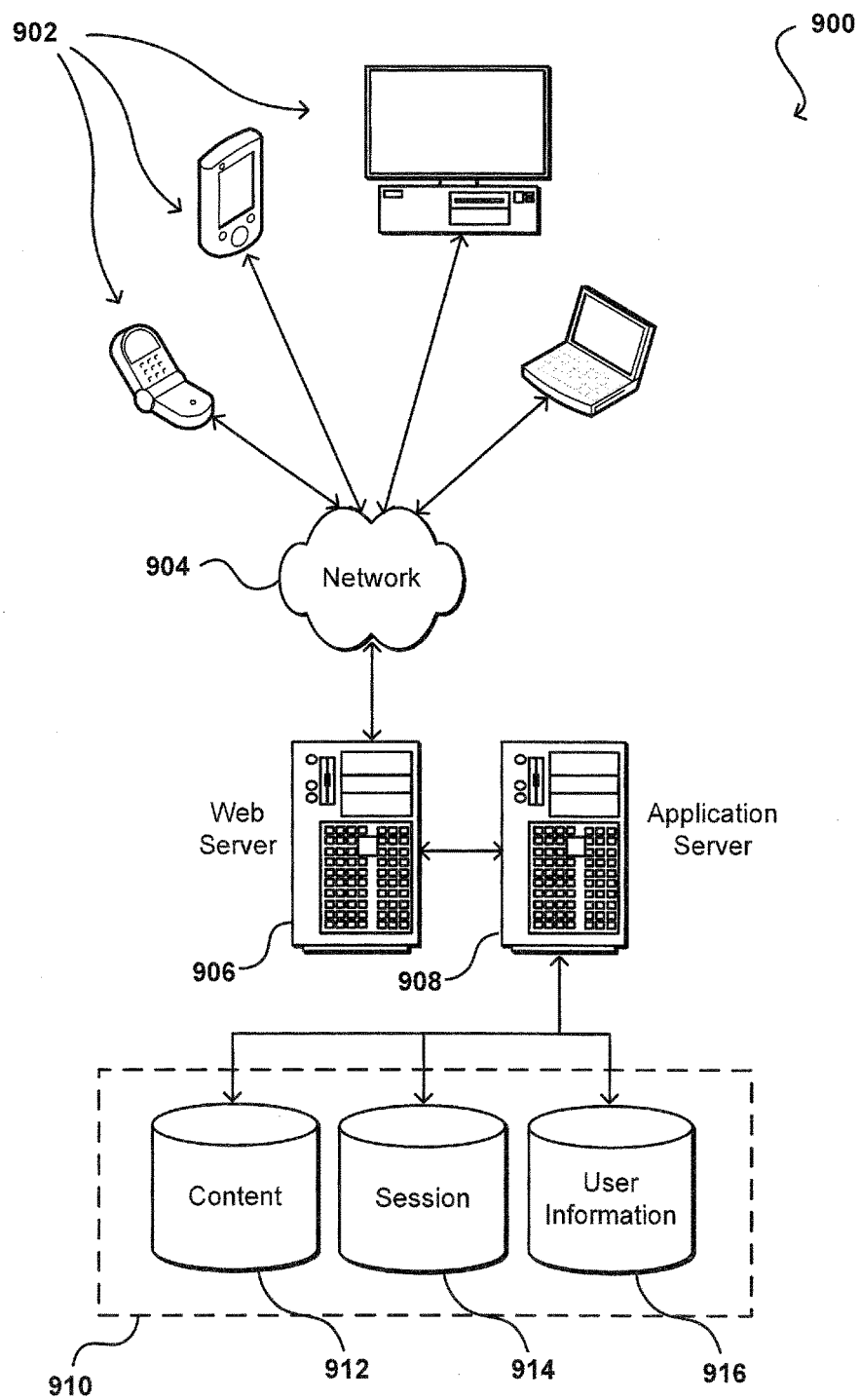
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system comprising:
a graphical interface;
at least one processor; and
memory including instructions that, when executed by the at least one processor, cause the computing system to:
obtain historical usage data indicative of one or more user-initiated activities performed at the computing system;
analyze the historical usage data to recognize one or more usage patterns, the one or more usage patterns within a first time period and associated with the one or more user-initiated activities performed at the computer system;
determine, using the one or more usage patterns, a computing task to be performed during a second time period and using the graphical interface, the second time period occurring after the first time period and when the computing task has a sufficient likelihood of being initiated;
determine, before the second time period and without user initiation, a graphical element associated with the computing task; and
cause the graphical interface to present, before the second time period, the graphical element.

2. The computing system of claim 1, wherein analyzing the historical usage data to recognize the one or more usage patterns, further comprises:
determining that the one or more user-initiated activities have a sufficient likelihood of recurring within the second time period.

3. The computing system of claim 1, wherein determining the computing task to be performed at the computing system, further comprises:
analyzing the one or more usage patterns to determine that performance of the computing task at the computing system has a sufficient likelihood of recurring within the second time period.

4. The computing system of claim 1, wherein the computing task corresponds to making a communication, and wherein providing the at least one recommendation further comprises at least one of:
recommending at least one contact with which the communication is to be made, the at least one contact being recommended based, at least in part, on the one or more usage patterns; or
generating message content to be included in the communication to the at least one contact, the message content being generated based, at least in part, on the one or more usage patterns.

5. The computing system of claim 1, further comprising:
identifying at least one recommended application having a sufficient likelihood of being relevant to the user, the at least one recommended application being identified based, at least in part, on the one or more usage patterns; or
identifying a recommended web location based, at least in part, on the one or more usage patterns and loading, at a browsing application, at least a portion of data associated with the recommended web location prior to receiving a user-initiated instruction to navigate to the recommended web location.

6. A computer-implemented method comprising:
obtaining usage data associated with a computing device;
analyzing the usage data to determine one or more usage patterns associated with the computing device, the one or more usage patterns within a first time period;
determining information that is likely relevant to a user of the computing device within a second time period after the first time period, the information being determined based, at least in part, on the one or more usage patterns within the first time period;
determining, using the information, a task expected to be performed, wherein the task is expected to be performed during the second time period and using a graphical interface of the computing device;
determining, before the second time period and without user initiation, a graphical element associated with the task; and
causing the graphical interface to present, before the second time period, the graphical element.

7. The computer-implemented method of claim 6, wherein analyzing the usage data to determine the one or more usage patterns, further comprises:
determining that one or more user-initiated activities performed using the computing device have a sufficient likelihood of recurring within the second time period.

8. The computer-implemented method of claim 7, wherein determining the information that is likely relevant to the user, further comprises:
identifying data that is associated with the one or more user-initiated activities that have the sufficient likelihood of recurring within the second time period.

9. The computer-implemented method of claim 6, wherein the usage data is associated with at least one of communication data, calendar data, clock data, geolocation data, orientation data, image data, audio data, web browsing data, network data, or application data.

10. The computer-implemented method of claim 6, wherein the information that is likely relevant to the user is associated with at least one of a contact associated with the user, a communication with which the user is engaged, an application used by the user, media content accessed by the user, or a web interaction related to the user.

11. The computer-implemented method of claim 6, further comprising
performing one or more computing tasks using, at least in part, the information that is likely relevant to the user, wherein the information includes at least one of:
contact data, wherein the one or more computing tasks comprises displaying the contact data; or
message contents to be included in a communication to a second computing device, the message contents being generated based, at least in part, on the one or more usage patterns.

12. The computer-implemented method of claim 6, wherein the information includes a recommendation for an application, and wherein the method further comprises:
loading data to be utilized, at least in part, by the application, the data being loaded prior to a user-initiated instruction to load the data, wherein the data is associated with at least one of a web resource or media content, and wherein the application corresponds, respectively, to a web browsing application configured to access the web resource or a media application configured to access the media content.

13. The computer-implemented method of claim 6, wherein the access to the information is provided via at least one of a page interface, a desktop interface, an operating system interface, a notification, a reminder, a calendar event, or an application interface.

14. The computer-implemented method of claim 6, further comprising:
    establishing a communication with at least a second computing device, wherein access to the information is provided to the second computing device via the communication.

15. A non-transitory computer-readable storage medium including instructions that, when executed by at least one processor of a computing system, cause the computing system to:
    obtain usage data associated with the computing system;
    analyze the usage data to determine one or more usage patterns associated with the computing system, the one or more usage patterns within a first time period;
    determine information that is likely relevant to a user of the computing system within a second time period after the first time period, the information being determined based, at least in part, on the one or more usage patterns within the first time period;
    determine, using the information, a task expected to be performed, wherein the task is expected to be performed during the second time period and using a graphical interface of the computing device;
    determine, before the second time period and without user initiation, a graphical element associated with the task; and
    cause the graphical interface to present, before the second time period, the graphical element.

16. The non-transitory computer-readable storage medium of claim 15, wherein analyzing the usage data to determine the one or more usage patterns further comprises determining that one or more user-initiated activities performed using the computing device have a sufficient likelihood of recurring within the second time period, and wherein determining the information that is likely relevant to the user further comprises identifying data that is associated with the one or more user-initiated activities that have the sufficient likelihood of recurring within the second time period.

17. The non-transitory computer-readable storage medium of claim 15, wherein the instructions cause the computing system to further:
    obtain at least a portion of the usage data using one or more geolocation sensors.

18. The non-transitory computer-readable storage medium of claim 15, wherein the instructions cause the computing device to further:
    provide an option to enable or disable the access to the information from being provided to an application on the computing device.

19. The non-transitory computer-readable storage medium of claim 15, wherein obtaining the usage data further comprises:
    accessing information indicative of how the user uses the computing device, the information including at least one of communication data, calendar data, clock data, geolocation data, orientation data, image data, audio data, web browsing data, network data, or application data.

20. The non-transitory computer-readable storage medium of claim 15, wherein the information that is likely relevant to the user is associated with at least one of a contact associated with the user, a communication with which the user is engaged, an application used by the user, media content accessed by the user, or a web interaction related to the user.

* * * * *